United States Patent
Hallock et al.

(10) Patent No.: US 11,618,357 B1
(45) Date of Patent: Apr. 4, 2023

(54) LENGTHWISE FASTENER

(71) Applicant: Lear Corporation, Southfield, MI (US)

(72) Inventors: Joshua Hallock, Warren, MI (US); Sam Blair, Troy, MI (US); Michael Corvino, Southfield, MI (US); Todd W. Waelde, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/472,957

(22) Filed: Sep. 13, 2021

(51) Int. Cl.
*B60N 2/60* (2006.01)
*B60N 2/58* (2006.01)

(52) U.S. Cl.
CPC .................................. *B60N 2/5825* (2013.01)

(58) Field of Classification Search
CPC ...... B60N 2/5883; B60N 2/5891; B60N 2/58; B60N 2/5825; B60N 2/5833; B60N 2/90; B60R 13/02; D03D 1/00; D03D 11/02; D03D 1/0043
See application file for complete search history.

(56) References Cited

U.S. PATENT DOCUMENTS

| | | | | |
|---|---|---|---|---|
| 1,794,159 A | * | 2/1931 | Dinsmore | D03D 3/00 139/384 R |
| 3,940,812 A | * | 3/1976 | DiForti | A43B 9/00 D6/606 |
| 5,989,373 A | * | 11/1999 | Gangi | B32B 3/04 156/93 |
| 6,450,678 B1 | * | 9/2002 | Bayersdorfer | B60Q 3/51 362/581 |
| 7,703,855 B1 | * | 4/2010 | Kalinowski | B60N 2/809 297/452.6 |
| 8,215,810 B2 | * | 7/2012 | Welch, Sr | B60Q 3/217 362/501 |
| 8,465,093 B2 | * | 6/2013 | Janowski | B60N 2/58 297/229 |
| 8,522,406 B2 | * | 9/2013 | Voigt | B60N 2/5841 24/306 |
| 8,662,583 B2 | * | 3/2014 | Guadagno | B60N 2/5833 297/218.1 |
| 8,882,203 B2 | * | 11/2014 | Takehara | B60N 2/5833 297/452.6 |
| 9,044,096 B2 | * | 6/2015 | Tanaka | B60N 2/5883 |
| 9,440,582 B2 | * | 9/2016 | Bayersdorfer | B60Q 3/64 |
| 9,703,029 B2 | * | 7/2017 | Wenzel | G02B 6/001 |
| 10,076,983 B2 | * | 9/2018 | Nishikido | B60N 2/5883 |
| 10,112,514 B2 | * | 10/2018 | Lemarchand | B60N 2/5883 |
| 10,259,386 B2 | * | 4/2019 | Unger | B60Q 3/78 |
| 10,532,675 B2 | * | 1/2020 | Booth | B60N 2/5825 |
| 10,576,852 B2 | * | 3/2020 | Sasaki | A47C 31/02 |

(Continued)

FOREIGN PATENT DOCUMENTS

| | | |
|---|---|---|
| DE | 102016209011 A1 | 11/2017 |
| FR | 2926756 B1 | 4/2010 |
| JP | 2001197970 A | 7/2001 |

*Primary Examiner* — Shin H Kim

(74) *Attorney, Agent, or Firm* — Brooks Kushman P.C.

(57) ABSTRACT

A flexible lengthwise fastener is provided with a first retainer provided with a lengthwise substrate. The lengthwise fastener is also provided with a second retainer provided with a lengthwise substrate to engage with the lengthwise substrate of the first retainer. When the first retainer and the second retainer are combined, the first retainer and the second retainer provide the appearance of a traditional seam.

21 Claims, 2 Drawing Sheets

(56) References Cited

U.S. PATENT DOCUMENTS

| | | | | |
|---|---|---|---|---|
| 10,773,619 | B1* | 9/2020 | Hamlin | B60N 2/6027 |
| 10,836,308 | B2* | 11/2020 | Unger | G02B 6/001 |
| 11,096,436 | B2* | 8/2021 | Nishiyama | B60N 2/5891 |
| 11,220,195 | B2* | 1/2022 | Hering | B68G 7/105 |
| 2007/0035165 | A1* | 2/2007 | Zahel | B60N 2/5825 |
| | | | | 297/228.11 |
| 2013/0093225 | A1* | 4/2013 | Janowski | B60N 2/6018 |
| | | | | 297/223 |
| 2014/0183925 | A1* | 7/2014 | Clauser | B60N 2/5825 |
| | | | | 297/452.38 |
| 2015/0375654 | A1* | 12/2015 | Lemarchand | D05B 15/00 |
| | | | | 297/452.1 |
| 2016/0375807 | A1* | 12/2016 | Kageyama | B60N 2/58 |
| | | | | 297/452.61 |
| 2017/0088028 | A1* | 3/2017 | Nishikido | B60N 2/5883 |
| 2017/0151897 | A1* | 6/2017 | Nishikido | B60N 2/58 |
| 2019/0001877 | A1* | 1/2019 | Unger | B60N 2/58 |
| 2019/0193631 | A1* | 6/2019 | Unger | B60Q 3/64 |
| 2019/0366892 | A1* | 12/2019 | Booth | B60N 2/5825 |
| 2020/0123684 | A1* | 4/2020 | Nishimura | D03D 3/02 |

* cited by examiner

LENGTHWISE FASTENER

TECHNICAL FIELD

Various embodiments related to lengthwise fasteners for vehicle seat assemblies.

BACKGROUND

Existing lengthwise fasteners are used in vehicle seat assemblies to secure seat covers/trim covers to a vehicle seat. Conventional zippers use interlocking teeth and a pull tab.

SUMMARY

According to an embodiment, a flexible lengthwise fastener has a first retainer provided with a lengthwise substrate. The lengthwise fastener also has a second retainer provided with a lengthwise substrate to engage with the lengthwise substrate of the first retainer. When the first retainer and the second retainer are combined, the first retainer and the second retainer provide the appearance of a traditional seam.

According to a further embodiment, the first retainer is further provided with a plurality of projections incrementally spaced apart along a length of the first retainer. Each of the plurality of projections is provided with a distal end and a proximal end.

According to another further embodiment, the distal end of the plurality of projections of the first retainer has a rounded edge.

According to another further embodiment, the first retainer is provided with a first raised portion along a length of the lengthwise substrate, and a second raised portion along the proximal end of the plurality of projections.

According to another even further embodiment, a plurality of apertures incrementally spaced along a length of the lengthwise substrate is provided on the first retainer, located in between the first raised portion and the second raised portion.

According to yet another further embodiment, a plurality of recesses with an arcuate shape are formed in the second retainer to allow the second retainer to pivot towards the first retainer and align the lengthwise substrate of the first retainer with the lengthwise substrate of the second retainer.

According to yet another even further embodiment, the first retainer is provided with a plurality of projections incrementally spaced apart along a length of the first retainer, and each of the plurality of projections is provided with a distal end and approximal end. The plurality of recesses of the second retainer engage with the distal end of the plurality of projections of the first retainer.

According to another further embodiment, the second retainer is provided with a first raised portion of the lengthwise substrate and a second raised portion located on a proximal end of the plurality of recesses.

According to yet another further embodiment, the second retainer is further provided with a plurality of bars incrementally spaced along a length of the second retainer to space apart the first raised portion and the second raised portion.

According to yet another further embodiment, a series of locking mechanisms are provided to the plurality of bars to engage with the apertures of the first retainer. The locking mechanisms are incrementally spaced apart relative to the spacing of the apertures in the first retainer.

According to another even further embodiment, the locking mechanisms are provided with a leading edge to engage with the aperture of the first retainer, and an abutment edge to engage with the plurality of bars of the second retainer.

According to another even further embodiment, the locking mechanisms prevent disassembly once the locking mechanisms engage with the aperture of the first retainer.

According to another embodiment, a trim cover for a seat assembly is provided with a trim cover for a seat bottom, a seat back, or a head restraint. A flexible lengthwise fastener is attached along a seam of the trim cover.

According to a further embodiment, the trim cover is formed with a first edge that is attached along a length of the first retainer, abutting the lengthwise substrate. The trim cover is also provided with a second edge that is spaced apart from and opposing the first edge, that is attached along a length of the second retainer and spaced from the plurality of recesses.

According to another further embodiment, rotation of the lengthwise fastener creates a seam along a first edge and a second edge of the trim cover such that the lengthwise fastener is hidden to an end user.

According to an embodiment, a seat assembly is provided with a seat bottom, a seat back extending upright from the seat bottom, and a trim cover disposed over the seat bottom or seat back.

According to an embodiment, a method of assembling a lengthwise fastener includes engaging a plurality of projections of a first retainer into a plurality of recesses of a second retainer to connect the first retainer to the second retainer. Then, rotating the first retainer and the second retainer towards each other to engage a series of locking mechanisms of the second retainer to a series of apertures of the first retainer.

According to a further embodiment, the method of assembly further includes manually disassembling the lengthwise fastener.

According to another further embodiment, the method of assembly further includes pivoting the lengthwise fastener to create a seam in a trim cover attached to the first retainer and the second retainer.

According to an embodiment, a seat assembly is provided with a seat bottom, a seat back extending upright from the seat bottom, a head restraint oriented above the seat back, a trim cover disposed over the seat bottom, the seat back, or the head restraint, and a flexible lengthwise fastener to fasten the trim cover along a seam. The lengthwise fastener is provided with a first retainer with a lengthwise substrate and a plurality of projections incrementally spaced apart along a length of the first retainer. The first retainer is also provided with a first raised portion along a length of the lengthwise substrate, and a second raised portion along a proximal end of the plurality of projections. The first retainer is also provided with a plurality of apertures located between the first raised portion and the second raised portion. The lengthwise fastener is also provided with a second retainer provided with a lengthwise substrate to engage with the lengthwise substrate of the first retainer and a plurality of recesses. The plurality of recesses has an arcuate shape to allow the second retainer to pivot towards the first retainer. The second retainer is also provided with a first raised portion, a second raised portion, a plurality of bars, and a series of locking mechanisms. The plurality of bars is located in between the first raised portion and the second raised portion. The series of locking mechanisms are attached to the plurality of bars. The trim cover is provided with a first edge that is attached along a length of the first retainer, abutting the lengthwise substrate; and a second edge that is spaced apart from and opposing the first edge, that is attached along a length of the second retainer and spaced from the plurality of recesses.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
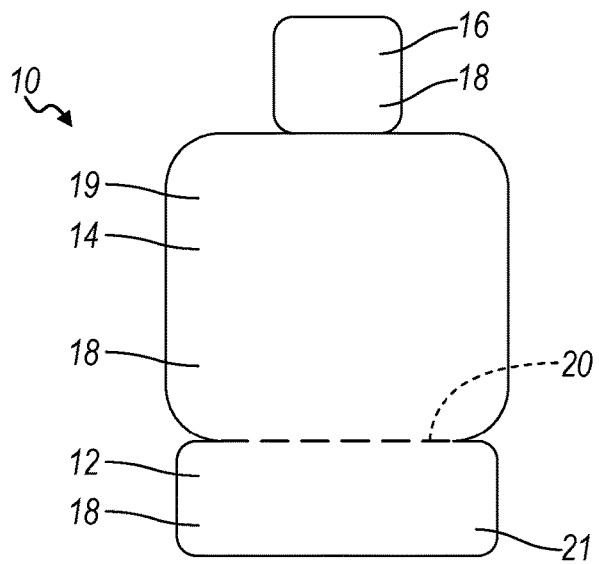
FIG. 1 illustrates a front elevation view of a vehicle seat assembly according to an embodiment.

FIG. 1 illustrates a vehicle seat assembly 10 according to an embodiment. The vehicle seat assembly 10 is provided with a seat bottom 12 adapted to be mounted to a vehicle floor. The vehicle seat assembly 10 may be provided in any row of a vehicle. The vehicle seat assembly 10 may also be employed in any type of vehicle, including land vehicles, watercrafts, aircrafts, or the like. The seat assembly 10 may be any seat assembly, such as an office chair, furniture, a dentist chair, or the like. The vehicle seat assembly 10 includes a seat back 14 extending upright from the seat bottom 12. The vehicle seat assembly 10 also includes a head restraint 16 extending above the seat back 14.

The seat bottom 12, the seat back 14, and the head restraint 16 each include a trim cover 18, 19, 21. The trim cover 18, 19, 21 is sized to extend over and conceal a frame, cushioning, and internal components of the seat bottom 12, the seat back 14, and the head restraint 16. Each trim cover 18, 19, 21 may include ornamentation, styling, and the like to visually enhance the seat assembly 10.

Each of the trim covers 18, 19, 21 is formed with an opening to be installed over the seat bottom 12, the seat back 14, and the head restraint 16. During installation, the opening is closed, which creates a seam 20 along the seat components. The openings of the trim covers 18, 19, 21 are traditionally closed with a lengthwise fastener such as a zipper. Traditional zippers do not provide flexibility and thus locating an accessible place for the zippers during production can be difficult.

Figure 2:
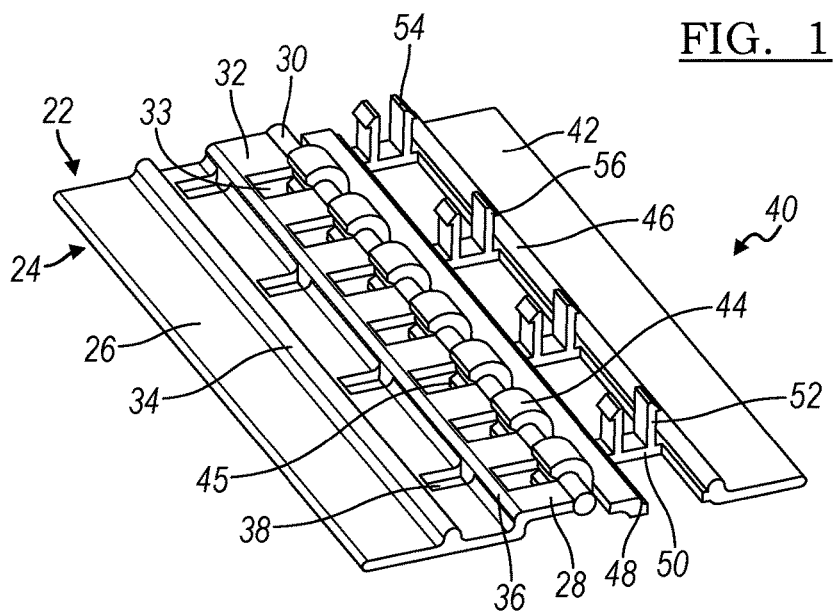
FIG. 2 illustrates a perspective view of a lengthwise fastener of the vehicle seat assembly of FIG. 1 according to an embodiment.
Figure 3:
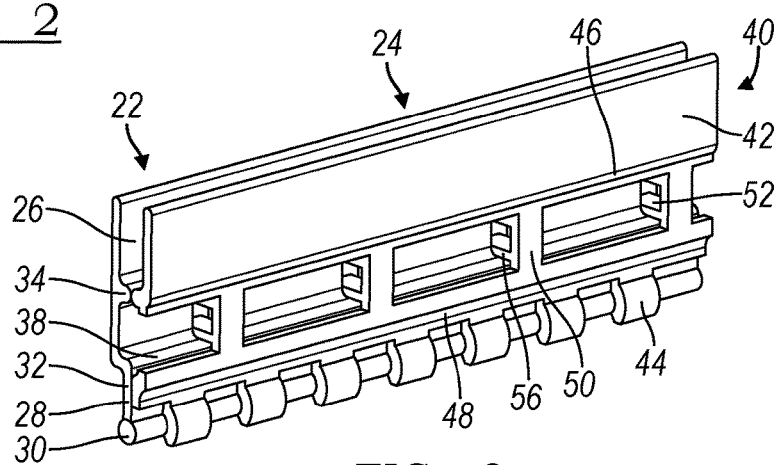
FIG. 3 illustrates a side perspective view of the lengthwise fastener of FIG. 2.
Figure 4:
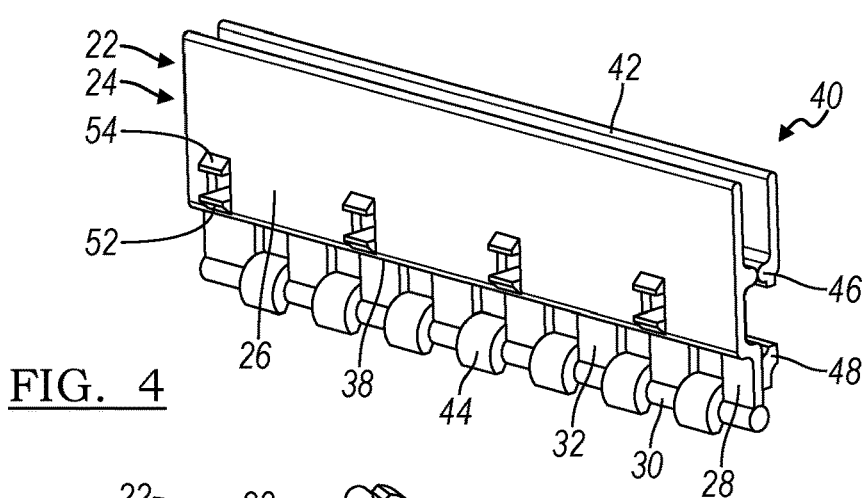
FIG. 4 illustrates another side perspective view of the lengthwise fastener of FIG. 2.

Referring to FIG. 2-4, a lengthwise fastener 22 is illustrated. The lengthwise fastener 22 is provided with a first retainer 24 and a second retainer 40. The first retainer 24 is provided with a lengthwise substrate 26 for attachment to the trim cover 18, 19, 21. The first retainer 24 is also provided with a plurality of projections 28. Each of the plurality of projections 28 has a distal end 30 and a proximal end 32. The distal ends 30 are spaced incrementally apart, providing a corresponding plurality of recesses 33. The distal ends 30 of the plurality of projections 28 may extend as a unitary, continuous distal end 30. The distal ends 30 may have a rounded edge.

The first retainer 24 has a first raised portion 34 upon the substrate 26. A second raised portion 36 extends from an end of the substrate 26 and is connected to the plurality of projections 28. The first raised portion 34 and the second raised portion 36 are spaced apart by a plurality of incrementally spaced apart apertures 38. The first retainer 24 may be formed from a semi-rigid and flexible material, such as an extruded polymer.

The second retainer 40 is provided with a lengthwise substrate 42, with an overall shape and size akin to the lengthwise substrate 26 of the first retainer 24. The second retainer 40 is also provided with a plurality of receptacles 44, each of the plurality of receptacles 44 having an arcuate recess 45 formed therein. The plurality of receptacles 44 each receive the distal end 30 of the plurality of projections 28 of the first retainer 24. The plurality of receptacles 44 allow the second retainer 40 to rotate and engage with the first retainer 24 and align the substrate 26 of the first retainer with the substrate 42 of the second retainer 40.

The second retainer 40 has a first raised portion 46 extending from the substrate 42. A second raised portion 48 is connected to, and spaced apart from, the first raised portion 46 by a plurality of bars 50. The plurality of bars 50 are incrementally spaced apart in relation to the plurality of apertures 38 of the first retainer 24. Attached to the plurality of bars 50 is a series of locking mechanisms 52. The locking mechanisms 52 are spaced apart and sized to fit within the plurality of apertures 38 of the first retainer 24. Each of the locking mechanisms 52 is provided with a leading edge 54 and an abutment edge 56. The leading edges 54 of the locking mechanisms 52 of the second engage within the plurality of apertures 38 of the first retainer 24 to compress. Upon insertion, the abutment edges 56 pass through the undersized apertures 38, and then expand to abut the substrate 26 and prevent disassembly.

The lengthwise fastener 22 is utilized to fasten a seam of the trim cover 18, 19, 21 along its length to enclose a component of the vehicle seat assembly 10. The lengthwise fastener 22 provides additional flexibility and makes assembly easier, as opposed to a traditional zipper. The lengthwise fastener 22 also provides additional stability to the seat assembly 10.

Figure 5:
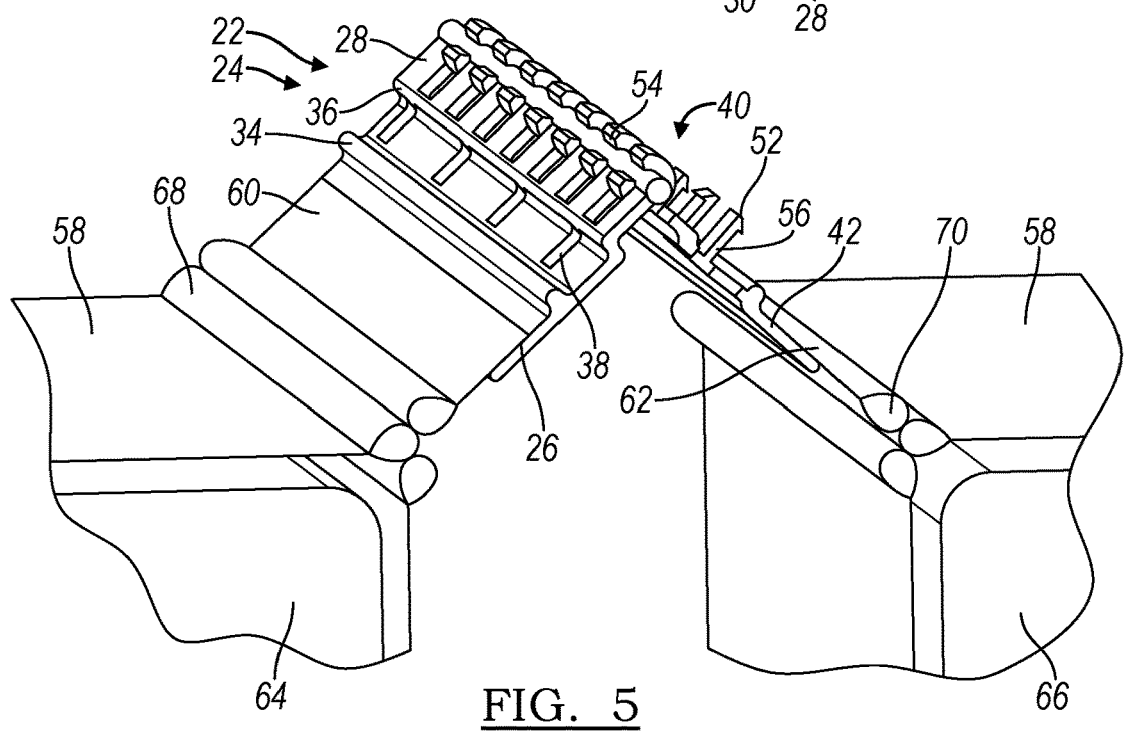
FIG. 5 illustrates a perspective end view of the lengthwise fastener of FIG. 2 attached to a trim cover of the vehicle seat assembly of FIG. 1, illustrated during assembly.

FIG. 5 illustrates the lengthwise fastener 22 connected to a trim cover 58. There are two different seat cushions 64, 66 shown in FIG. 5. According to one embodiment, the seat cushions 64, 66 are adjacent cushions, such as a central insert 66, and a laterally outboard bolster 64. The lengthwise fastener 22 can be provided along any seam, and between any adjacent pair of cushions 64, 66. A portion of the trim cover 58 attached to each cushion 64, 66. The trim cover is provided with a first edge 60 and a second edge 62. Attached to the edges 60, 62 of the trim cover 58 is the lengthwise fastener 22.

The first edge 60 of the trim cover 58 is attached along a length of the first retainer 24, abutting the lengthwise substrate 26. The second edge 62 of the trim cover 58 is spaced apart and opposing the first edge 60. The second edge 62 is attached along a length of the second retainer 40 and spaced from the plurality of receptacles 44. The trim cover 58 is formed from a fabric or textile material. The trim cover 58 may be sewn, welded or otherwise fastened to the substrates 26, 42 of the lengthwise fastener 22. A first seam 68 of the trim cover 58 may be provided between the cushion 64 and the first edge 60 of the trim cover 58. A second seam 70 may also be provided between the cushion 66 and the second edge 62. The seams 68, 70 may be decorative, and may take the form of piping, or double piping, as illustrated.

Figure 6:
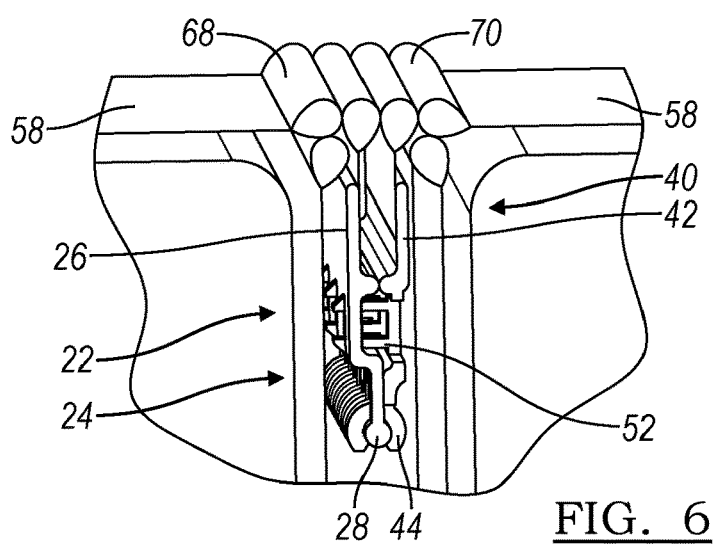
FIG. 6 illustrates another perspective end view of the lengthwise fastener and trim cover of FIG. 5, illustrated assembled.

Referring again to FIG. 5, the first retainer 24 and the second retainer 40 engage with one another during an assembly process. The plurality of projections 28 of the first retainer 24 are placed within the plurality of receptacles 44 of the second retainer 40. The first retainer 24 and the second retainer 40 are pivoted to converge together between the cushions 64, 66. As illustrated in FIG. 6, the locking mechanism 52 of the second retainer 40 engages with the apertures 38 of the first retainer 24 to connect the first retainer 24 with the second retainer 40. The position the lengthwise fastener 22 is shown in FIG. 5 is prior to the lengthwise fastener 22 being rotated so that the lengthwise substrate 26 of the first retainer 24 align with the lengthwise substrate 42 of the second retainer.

FIG. 6 illustrates the lengthwise fastener 22 after complete rotation of the first retainer 24 and the second retainer 40. The locking mechanism 52 of the second retainer 40 is fully engaged with the apertures 38 of the first retainer 24. The leading edge 54 of the locking mechanism 52 of the second retainer 40 extends through the apertures 38 of the first retainer 24. The substrates 26, 42 of their corresponding retainers 24, 40 are aligned with one another. The first edge 60 of the trim cover 58 and the second edge 62 of the trim cover 58 are collapsed with the first and second seams 68, 70 converged and adjacent to provide a lengthwise seam 68, 70 along the length. The lengthwise seam 68, 70 fully conceals the lengthwise fastener 22 so that the lengthwise fastener 22 is hidden to an end user. The seam 68, 70 may provide an appearance of a conventional seam, or a seam with piping.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A flexible lengthwise fastener comprising:
   a first retainer with a lengthwise substrate; and
   a second retainer with a lengthwise substrate to engage with the lengthwise substrate of the first retainer;
   wherein the first retainer and the second retainer are combinable, such that the first retainer and the second retainer provide an appearance of a traditional seam; and
   whereby rotation of the lengthwise fastener creates a seam along a first edge and a second edge of a trim cover such that the lengthwise fastener is hidden to an end user.

2. The lengthwise fastener of claim 1, wherein the first retainer further comprises a plurality of projections incrementally spaced apart along a length of the first retainer, and wherein each of the plurality of projections is provided with a distal end and a proximal end.

3. The lengthwise fastener of claim 2, wherein the distal end of the plurality of projections of the first retainer has a rounded edge.

4. The lengthwise fastener of claim 2, wherein the first retainer further comprises a first raised portion along a length of the lengthwise substrate, and a second raised portion along the proximal end of the plurality of projections.

5. The lengthwise fastener of claim 4, further comprising a plurality of apertures incrementally spaced along a length of the lengthwise substrate of the first retainer located in between the first raised portion and the second raised portion.

6. The lengthwise fastener of claim 1, wherein a plurality of recesses with an arcuate shape are formed in the second retainer to allow the second retainer to pivot towards the first retainer and align the lengthwise substrate of the first retainer with the lengthwise substrate of the second retainer.

7. The lengthwise fastener of claim 6, wherein the first retainer further comprises a plurality of projections incrementally spaced apart along a length of the first retainer, and wherein each of the plurality of projections is provided with a distal end and a proximal end; and
   wherein the plurality of recesses of the second retainer engages with the distal end of the plurality of projections of the first retainer.

8. The lengthwise fastener of claim 6, wherein the second retainer is provided with a first raised portion on the lengthwise substrate and a second raised portion located on a proximal end of the plurality of recesses.

9. The lengthwise fastener of claim 5, wherein the second retainer further comprises a plurality of bars incrementally spaced along a length of the second retainer, to space apart the first raised portion and the second raised portion.

10. The lengthwise fastener of claim 9, further comprising a series of locking mechanisms that are attached to the plurality of bars to engage with the plurality of apertures of the first retainer, wherein the locking mechanisms are incrementally spaced apart relative to the spacing of the apertures in the first retainer.

11. The lengthwise fastener of claim 10, wherein the series of locking mechanisms are provided with a leading edge to engage with the plurality of apertures of the first retainer, and an abutment edge to engage with the plurality of bars of the second retainer.

12. The lengthwise fastener of claim 10, wherein the locking mechanisms prevent disassembly once the locking mechanisms engage with the plurality of apertures of the first retainer.

13. A trim cover assembly for a seat comprising:
   a trim cover for a seat bottom, a seat back, or a head restraint; and
   the flexible lengthwise fastener of claim 1 attached along a seam of the trim cover.

14. The trim cover assembly of claim 13, wherein the trim cover is formed with a first edge that is attached along a length of the first retainer, abutting the lengthwise substrate; and
   wherein the trim cover is formed with a second edge that is spaced apart from and opposing the first edge, that is attached along a length of the second retainer and spaced from a plurality of recesses.

15. A seat assembly comprising:
   a seat bottom;
   a seat back extending upright from the seat bottom; and
   the trim cover of claim 14 disposed over the seat bottom or the seat back.

16. A method of assembling the flexible lengthwise fastener of claim 1, the method comprising:
engaging a plurality of projections of the first retainer into a plurality of recesses of the second retainer to connect the first retainer to the second retainer; and
rotating the first retainer and the second retainer towards each other to engage a series of locking mechanisms of the second retainer to a series of apertures of the first retainer.

17. The method of assembly of claim 16, further comprising manually disassembling the lengthwise fastener.

18. The method of assembly of claim 16, further comprising pivoting the lengthwise fastener to create the seam in the trim cover attached to the first retainer and the second retainer.

19. A seat assembly comprising:
a seat bottom;
a seat back extending upright from the seat bottom;
a head restraint oriented above the seat back;
a trim cover disposed over the seat bottom, the seat back, or the head restraint;
a flexible lengthwise fastener to fasten the trim cover along a seam;
a first retainer provided with a lengthwise substrate, a plurality of projections incrementally spaced apart along a length of the first retainer, a first raised portion along a length of the lengthwise substrate, a second raised portion along a proximal end of the plurality of projections, and a plurality of apertures located between the first raised portion and the second raised portion;
a second retainer provided with a lengthwise substrate to engage with the lengthwise substrate of the first retainer, a plurality of recesses with an arcuate shape to allow the second retainer to pivot towards the first retainer, a first raised portion and a second raised portion, a plurality of bars located between the first raised portion and the second raised portion, and a series of locking mechanisms attached to the plurality of bars;
wherein the trim cover is formed with a first edge that is attached along a length of the first retainer, abutting the lengthwise substrate; and
wherein the trim cover is formed with a second edge that is spaced apart from and opposing the first edge, that is attached along a length of the second retainer and spaced from the plurality of recesses.

20. A flexible lengthwise fastener comprising:
a first retainer with a lengthwise substrate; and
a second retainer with a lengthwise substrate to engage with the lengthwise substrate of the first retainer;
wherein the first retainer and the second retainer are combinable, such that the first retainer and the second retainer provide an appearance of a traditional seam;
wherein the first retainer further comprises a plurality of projections incrementally spaced apart along a length of the first retainer, and wherein each of the plurality of projections is provided with a distal end and a proximal end; and
wherein the first retainer further comprises a first raised portion along a length of the lengthwise substrate, and a second raised portion along the proximal end of the plurality of projections.

21. A trim cover assembly for a seat comprising:
a trim cover for a seat bottom, a seat back, or a head restraint; and
a flexible lengthwise fastener attached along a seam of the trim cover, the flexible lengthwise fastener further comprising:
a first retainer with a lengthwise substrate, and
a second retainer with a lengthwise substrate to engage with the lengthwise substrate of the first retainer;
wherein the first retainer and the second retainer are combinable, such that the first retainer and the second retainer provide an appearance of a traditional seam;
wherein the trim cover is formed with a first edge that is attached along a length of the first retainer, abutting the lengthwise substrate; and
wherein the trim cover is formed with a second edge that is spaced apart from and opposing the first edge, that is attached along a length of the second retainer and spaced from a plurality of recesses.

* * * * *